March 24, 1970

P. T. THAYER 3,502,970

APPARATUS HAVING FILTER SCREEN FOR DETECTING
PARTICLES IN A FLUID STREAM

Filed Oct. 6, 1967

INVENTOR
*Patrick T. Thayer*

ATTORNEY

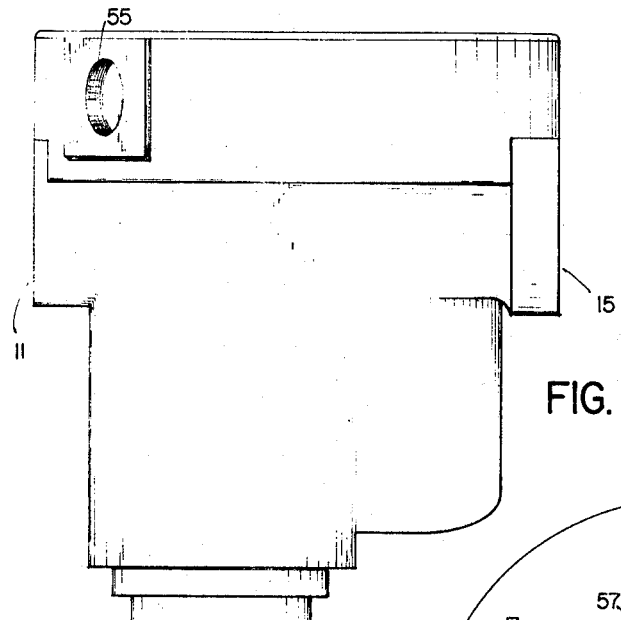
FIG. 4
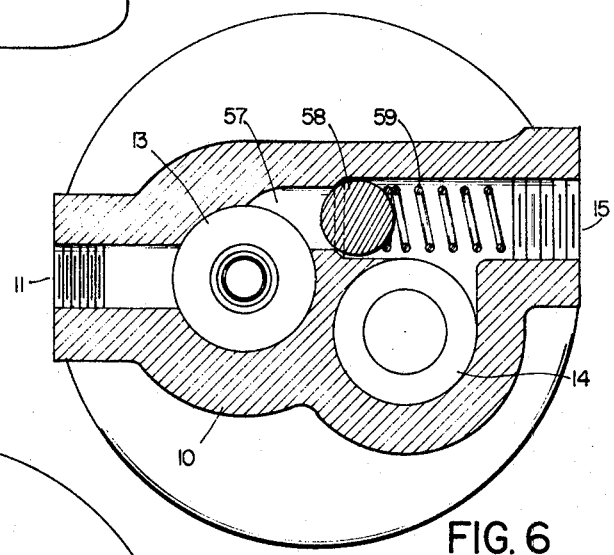
FIG. 6
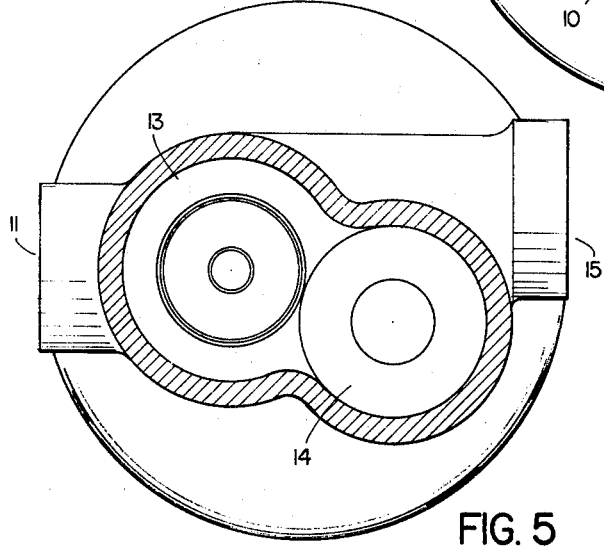
FIG. 5
INVENTOR
Patrick T. Thayer
ATTORNEY United States Patent Office 3,502,970
Patented Mar. 24, 1970

3,502,970
APPARATUS HAVING FILTER SCREEN FOR
DETECTING PARTICLES IN A FLUID STREAM
Patrick T. Thayer, 209 Elizabeth Road,
San Antonio, Tex. 78209
Filed Oct. 6, 1967, Ser. No. 673,351
Int. Cl. G01r 27/26; G01n 11/00
U.S. Cl. 324—61                               11 Claims

ABSTRACT OF THE DISCLOSURE

This application discloses apparatus for detecting the presence of particles in a fluid stream such as the lubricating oil system of an aircraft engine. A capacitance probe detects accumulation of metal particles on one side of a filter screen while a dummy probe is provided on the downstream side of the filter to compensate for changes in the oil or other fluid. The capacitance probe and dummy probe are connected in an RF bridge, the output of which is indicated on a meter. Unbalance of the bridge causes a reading on the meter indicating particle accumulation.

---

A catastrophic failure in a reciprocating engine, as would occur upon freezing of a piston or failure of a main bearing, is preceded by excessive wear of the parts of the engine which results in the presence of metal particles in the engine lubricating system. Thus, avoidance of failure of an aircraft engine in flight, or vast savings in maintenance costs by early repair, may be provided by use of a detecting system which is responsive to the presence of an excessive amount of metal particles in the lubricating oil system. However, heretofore the particle detectors which were available were not sufficiently sensitive or stable, or added too many additional parts to the lubrication system, so that the prior systems were not practical for widespread use.

It is therefore the principal object of this invention to provide a system for detecting particles or other unwanted materials in a fluid stream, particularly for detecting metal particles in an engine lubricating system. Another object is to provide apparatus for detecting metal particles in the lubricating oil stream of a reciprocating engine, particular features of such a system being stability, simplicity, reliability and low cost.

In accordance with this invention, particle detection apparatus is provided for connection into the lubricating oil system of an engine generally in the same position as the filter screen and sediment bowl as commonly used. In the preferred embodiment, the filter screen is cylindrical and the oil is directed from an input to the interior of the screen, then flows through the screen and to an output. A clean-out plug located below the cylindrical screen defines a sediment area where particles filtered out of the oil stream collect. A capacitance probe extends through the filter screen and into the sediment area. A second capacitance probe is located in a chamber about the same size of the filter screen but downstream of the filter so that this probe will detect the capacitive properties of the oil absent the particles which have been removed by the filter. An electronic circuit including an RF bridge detects the relative capacities exhibited by the two probes and produces an electrical indication which may be observed on a meter.

The novel features believed characteristic of the invention are set forth in the appended claims. The invention itself, however, as well as further objects and advantages thereof, will best be understood by reference to the following detailed description of a particular embodiment, when read in conjunction with the accompanying drawings, wherein:

FIGURE 4 is a side elevation view of the housing of FIGURE 1;

FIGURE 5 is a sectional view of the apparatus of FIGURE 4, taken along the line 5—5 in FIGURE 4; and FIGURE 6 is a sectional view of the housing of FIGURE 4, taken along the line 6—6 in FIGURE 4.

Figure 1:
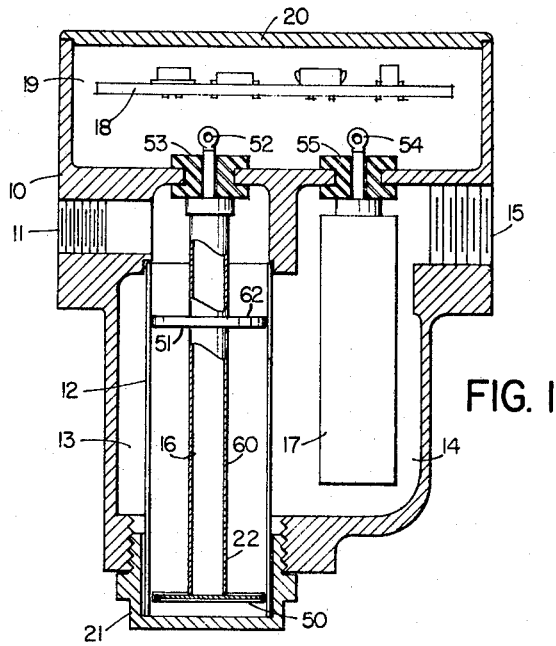
FIGURE 1 is a composite elevational view in section of the housing for the filter screen, capacitance probes, and electronic circuitry of the engine wear monitor according to this invention.

With reference to FIGURE 1 of the drawings, a composite sectional view of a housing 10 for the various parts of the engine wear monitor of the invention is illustrated, the planes through which this sectional view is taken being shifted to illustrate the major parts of the unit. The housing 10, usually composed of cast and machined metal, includes an inlet 11 which is threaded to receive a fitting for connection to a lubricating oil pump in an aircraft engine, for example. The oil entering the inlet 11 under pressure first passes into the interior of a tubular or cylindrical wire mesh filter 12, this filter screen being of the type generally used in aircraft engines to trap any metal particles suspended in the lubricating oil system due to engine wear. The oil passes out through the filter screen 12 into a generally cylindrical chamber 13 from which it passes into a second chamber 14 and then out through an outlet 15 from which the oil is recirculated in the lubrication system in accordance with standard practice. Located within the filter screen 12 in the chamber 13 is a capacitance probe 16 which along with the electronic circuit as will be described performs the function of detecting particle accumulation caused by engine wear. A dummy probe 17 in the cylindrical chamber 14 functions in an RF bridge to balance out any changes in oil viscosity, temperature or carbon in solution. Electronic circuitry 18, generally illustrated in FIGURE 1 as a circuit board having the various components thereon, is located in a chamber 19 at the top of the housing, this chamber being closed off by a suitable lid 20. At the bottom of the housing 10 below the chamber 13 is a clean-out plug 21 in which sediment and particles will collect when stopped by the screen 12. This plug 21 may be removed for cleaning out the sediment or to replace or clean the filter screen 12. It should be noted that the major structural parts of the device of FIGURE 1 are used in a conventional lubrication system which would contain a housing for a filter screen along with a suitable inlet and outlet fittings and a clean-out plug. Thus, the housing 10 may be supplied at very little additional cost.

Figure 2A:
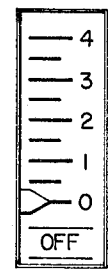
FIGURE 2a is a view of a meter face used with the circuit of FIGURE 2.
Figure 2:
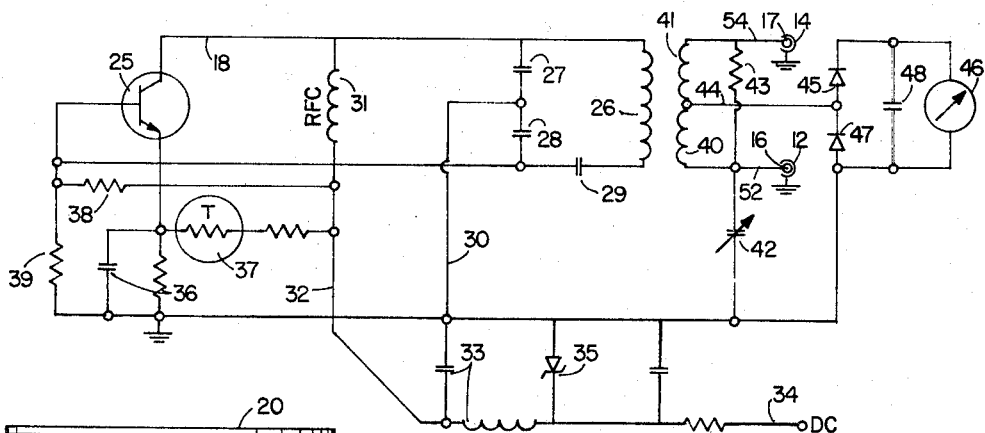
FIGURE 2 is a schematic diagram of the electronic circuit used in the engine wear monitor of FIGURE 1.

The electronic circuit 18 used with the capacitance probes 16 and 17 in the apparatus of FIGURE 1 is illustrated schematically in FIGURE 2. The circuit consists of an RF oscillator includng a transistor 25 along with a tuned circuit including an inductor 26 and a capacitor 27, coupling capacitors 28 and 29 connecting the tuned circuit back to the base of the transistor 25 to provide feedback for sustained oscillation. One side of the tuned circuit 26–27 is connected to ground by a conductor 30 connected to the capacitor 27. An RF choke 31 connects the collector of transistor 25 to a positive supply voltage line 32 which is connected through a filter 33 to an unregulated supply 34, a Zener diode 35 providing a constant input voltage. The emitter of the transistor 25 is connected to ground through an RC biasing network 36, with temperature compensation being provided by a thermally responsive resistor 37 connected through a small resistor to the V+ line 32. Base bias is provided by a pair of resistors 38 and 39 connected as a voltage divider between the V+ line and ground. The elements thus far described for the electronic circuit 18 merely comprise a thermally compensated oscillator of conventional form which provides a frequency which is selected to produce the desired sensitivity of the capacitance bridge. Loading of the oscillator circuit by the capacitance bridge has little effect on the oscillator frequency.

Coupled to the inductor 26 is a capacitance bridge including the capacitance probe 16 and the dummy probe 17 along with a pair of like coils 40 and 41. The coils 40 and 41 are wound in opposition to one another and inductively coupled to the inductor 26 so that RF voltages will be generated therein which will cancel if the capacities in the bridge are exactly equal. The capacitance on one side of the bridge includes the dummy probe 17 and the cylindrical housing 14, these two elements acting as the plates of the capacitor. The other side of the bridge includes the capacitance between the probe 16 and the filter screen 12 in the chamber 13. The screen 12 is electrically shorted to the housing 10 which is of course grounded. Exact balance of the bridge is obtained by a small variable capacitor 42 connected across the capacitance between probe 16 and filter screen 12. A resistor 43 shunting the inductors 40 and 41 prevents modeing of the oscillator at high temperatures. With this arrangement when the bridge is exactly balanced no voltage will appear on the bridge output at a center terminal 44, while unbalance will cause an RF voltage to appear at this bridge output with the magnitude depending upon the degree of unbalance. The output of the bridge taken from center terminal 44 is connected to the anode of diode 45 and the cathode of diode 47. The cathode of diode 45 is connected to one side of meter 46. The other side of the meter 46 and the anode of diode 47 are connected to ground. A capacitor 48 is connected in shunt across the meter 46. The meter 46 would usually be located on the aircraft instrument panel, the remaining components of the circuitry 18 except for the capacitor probes 16 and 17 being mounted on the circuit board in the chamber 19.

In the operation of the circuit of FIGURE 2, any changes in the dielectric constant of the material between the probe 16 and the screen 12 or the clean out plug 21, or changes in plate area or distance between the plates, any of which would be due to accumulation of metal particles, will unbalance the bridge and cause an RF voltage to appear on the output terminal 44. The voltage is applied to a voltage doubler-rectifier circuit comprising diode 45 and 47, the capacitance of the probes 16 and 17 functioning as charging condensers. Thus, the meter would read zero in the balanced condition and exhibit a positive needle movement for any type of unbalance. It is understood that the RF output from the tuned circuit 26-27 generated by the oscillator including the transistor 25 will remain at substantially constant amplitude and frequency.

With reference to FIGURE 2a, it will be noted that the meter 46 preferably includes a face having a moveable needle or indicator and scale which includes an off position as well as a zero position. The bridge is preferably slightly unbalanced, rather than exactly balanced, when the screen and sediment area are clean, this being adjusted by the variable capacitor 42. Thus, when the power is turned on, the needle moves from "OFF" to "ZERO." This arrangement permits the system to provide a confidence indicator (flag information) and permits the system to operate on a steep portion of the response curve for greater sensitivity rather than a flatter portion near zero. Movement of the needle from "OFF" to the "ZERO" position provides a confidence indication as movement of the flag indicates that the system is operative.

Referring again to FIGURE 1, it is noted that the capacitance probe 16 comprises an elongated cylindrical portion of conductive metal and includes a wide disc 50 at the lower end thereof which functions as a major plate of the capacitance for detecting accumulation of particles in the sediment basin or cleanout plug 21. One or more slotted or perforated discs 51 are included at the upper portion of the capacitance probe, holes in this disc permitting relatively free flow of oil therethrough. The upper end of the probe 16 includes a suitable feed-through arrangement for electrical connection by a terminal 52 to the electronic circuitry 18 in the chamber 19. An insulating washer or grommet 53, preferably composed of Teflon, seals the chamber at the feed-through point. In like manner, the dummy probe 17 includes a feed-through arrangement at its upper end to provide a terminal 54 in the chamber 19 for connection to the electronic circuit of FIGURE 2, a Teflon washer 55 being used here also.

The capacitance probe 16 is shown in FIGURE 1 to include an insulating coating 22 on its entire surface, including the surfaces of the discs 50 and 51. This insulating coating 22 functions to prevent electrical shorting of the probe 16 to the screen 12 or to the cap 21 by particles in the fluid.

It will be noted that the screen 12 extends into the cap 21 which defines a settlement trap with the screen 12 being held mechanically between the cap and a seat formed in the case 10. The screen is therefore electrically connected to the case. It will also be noted that the probe 16 also extends into the cap 21 with the lower disc 50 being spaced apart from the cap 21 and the screen 12. Thus, the principal portion of the capacitance provided between the probe 16 and the screen 12 and the cap 21 is from the capacitor having as one plate disc 50 and as the other plate the screen 12 and the cap 21. Accordingly, as material settles into the settlement trap, it will vary this capacitance. The second disc 51 is positioned on the shaft a substantial distance above the lower disc 50. Disc 51 is provided with a plurality of slots 62 of relatively large diameter such that there will be a substantially unimpeded flow of oil and particles through the disc 51. However, particles flowing between the edges of the disc 51 and the screen 12 will affect the capacitance provided by the probe 16 and this change in capacitance will provide an earlier indication of particles in the oil than will the settling in the particles into the settlement trap.

Figure 3:
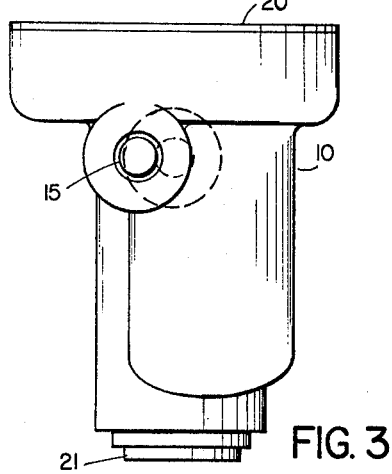
FIGURE 3 is an end view of the housing of FIGURE 1 taken from the right-hand end of FIGURE 1.

Referring now to FIGURE 3, an end elevation view of the housing 10 is shown facing the outlet port 15. It will be noted that the outlet 15 is offset with respect to the inlet 11 and the chamber 14 to provide for the bypass valve as will be described with reference to FIGURE 6. The upper portion of the housing 10, including the chamber 19 for the electronic circuitry, is seen to be generally cylindrical and wider than the lower portion including the filter screen and capacitance probes. The cleanout plug 21 includes a hexagonal shaped portion for factuating tightening and removal. In FIGURE 4, it will be noted that the upper portion of the housing containing the chamber 19 includes an aperture 55 for access to the electronic circuitry 18. A fitting connected through this aperture would include conductors connected to the D.C. supply 34 and to the meter 46 on the aircraft instrument panel.

In FIGURE 5, the relative sizes and shapes of the chamber 13 and 14 may be noted. The inside diameter of the chamber 14 is such that the capacitance between the wall of chamber 14 and the dummy probe 17 is about the same as the capacitance between probe 16 and the metal screen 12.

Referring now to FIGURE 6, the bypass arrangement between inlet 11 and outlet 15 is illustrated. From the upper portion of the chamber 13 is provided a passage 57 to a ball valve 58 leading into the outlet 15. The ball valve 58 is held firmly against the seat by a spring 59 which bears upon the ball and upon a fitting threaded into the outlet 15. If the pressure within the inlet 11 reaches a high value due to clogging of the filter screen 12 by excess particles or sediment, the ball valve 58 will be pushed away from its seat to permit lubricating oil to flow directly through the passage 57 to the outlet 15. This is a safety feature included in most lubrication systems and is not a primary feature of this invention.

What is claimed is:

1. Apparatus for detecting particles or other unwanted materials in a fluid stream comprising a first chamber, a tubular, electrically conductive filter screen means positioned in said chamber, a first electrode extending within said screen means, first insulating means for electrically insulating said first electrode from said screen means, inlet means for admitting the fluid stream into the filter screen means, said screen means and said first electrode forming a first capacitance sensor responsive to both the dielectric constant of the fluid and the collection of such particles between said screen means and said first electrode, a second capacitance sensor means having first and second plates and responsive to the dielectric constant of the fluid, outlet means for directing the flow of fluid passing through said filter screen means from said chamber between said first and second plates of said second capacitance sensor, means for detecting the relative capacitances exhibited by the first and second sensors, and means for producing an electrical indication thereof.

2. Apparatus as in claim 1 wherein the filter screen means is cylindrical in shape and said first electrode is generally coaxial therewith.

3. Apparatus as in claim 1 wherein the second capacitance sensor is a second electrode located coaxially in a second chamber having electrically conductive walls and of size that the capacitance between the second electrode and the wall of said second chamber is substantially the same as the capacitance between the first electrode and the filter screen means.

4. Apparatus as in claim 1 wherein said first chamber includes a collecting basin to receive particles extracted from the filter screen, and said filter screen means and said first electrode extends into said collecting basin.

5. Apparatus as in claim 4 wherein a wide-area capacitance plate is provided on said first electrode in said collecting basin.

6. Apparatus as in claim 1 wherein the first and second capacitance sensors are connected in a RF bridge circuit and further including means providing a visual indication of an unbalanced condition of the bridge.

7. Apparatus as in claim 6 wherein said means providing a visual indication is a meter coupled to said RF bridge circuit, said meter having a scale thereon whereby a selected degree of unbalance of said bridge provides an indication of "ZERO."

8. Apparatus as defined in claim 6 wherein said means providing a visual indication is a meter coupled to said RF bridge by a voltage doubler-rectifier circuit.

9. Apparatus as defined in claim 2 wherein said first electrode comprises an elongated shaft having a disc connected on one end thereof, said shaft and said disc being coated with an insulating material for preventing electrical shorting of said probe to said filter screen.

10. Apparatus as defined in claim 9 wherein said filter screen and said capacitance probe are positioned in the first chamber with the lower end of said chamber defining a sediment trap.

11. Apparatus as defined in claim 9 wherein said capacitance probe further includes at least one additional disc member positioned on said shaft above the first mentioned disc member, said additional disc member having slots found therein to permit the flow of particles downward to said first mentioned disc member.

References Cited

UNITED STATES PATENTS 2,783,420 2/1957 Thompson et al. ____ 324—61 X
3,238,452 3/1966 Schmitt et al. _____ 324—61

EDWARD E. KUBASIEWICZ, Primary Examiner

U.S. Cl. X.R.

73—64